Dec. 30, 1969  DE FORREST BOEDER  3,486,239
COMBINATION LEVEL AND COMPASS
Filed March 21, 1966

INVENTOR
DeFORREST BOEDER
BY Robert M. Dunning
ATTORNEY

# United States Patent Office 3,486,239
Patented Dec. 30, 1969

3,486,239
COMBINATION LEVEL AND COMPASS
De Forrest Boeder, Box 225,
Gibbon, Minn. 55335
Filed Mar. 21, 1966, Ser. No. 536,016
Int. Cl. G01c 9/20, 17/02
U.S. Cl. 33—212                    2 Claims

ABSTRACT OF THE DISCLOSURE

An azimuthally graduated spherical compass housing suspended pendulously on gimbals is interposed in the pedestal support of an inclinometer. The inclinometer is of the hollow transparent graduated globe type in which a bubble in the contained liquid serves as the index of amount and direction of tilt.

---

This invention relates to an improvement in combination level and compass, and deals particularly with a spherical level supported by a suitable base or mount and which is preferably combined with a free floating compass.

An object of the present invention resides in the provision of a level which may be used in combination with a compass so that the user may simultaneously note the inclination of an object with respect to a horizontal plane, and may also note the direction in which the surface is sloping.

Levels of the type used in carpentry and construction work of buildings and the like, require only an elongated tube which is supported exactly parallel to a surface of an elongated level body and which is virtually filled with a liquid, leaving a bubble of air which will move to the center of the transparent tube when the level body is horizontal. Obviously, levels of this type do not, and have no need to, show in degree the actual slant of the surface. However, in other work, it is desirable to know within close limits, the actual angularity of a surface with respect to the horizontal. At the same time, it is also sometimes important to know just what direction the surface slants.

I have found that a spherical globe such as a crystal ball, may serve as an effective level, if supported upon a suitable base. The undersurface of the base is preferably on a plane normal to an axis extending through the center of the sphere, and which may simulate the north and south poles of the sphere. Angularly spaced arcuate lines may be scribed on the outer surface of the sphere on planes which include the north and south poles, simulating the meridians on globes simulating the earth. Other circular lines may be scribed on the surface of the sphere, the center of such lines simulating the equator which is arranged on a plane normal to the axes of the poles and passing through the center of the sphere. The other circular lines are spaced predetermined angular distances above and below the equator by means of which the distance of a certain point from the equator may be noted. The transparent bulb is virtually filled with liquid, leaving an air bubble which is visible through the body of the sphere. By noting the position of this air bubble relative to the lines which have been scribed on the surface of the sphere, the relative angularity between the axes of the sphere and a vertical line through the center of the sphere, may be readily calculated. Thus, the angle or degree of the base surface may be noted.

A further feature of the present invention resides in providing a free floating compass in the base of the sphere. The compass is so supported as to support the axis of rotation vertical at all times. By noting the position of the compass relative to a position of the sphere, and noting the position of the bubble on the sphere, the direction of the slant as well as the degree of slant may be readily noted.

A feature of the present invention resides in the fact that the use of the scribed line on the surface of the sphere increases the accuracy in determining the exact position of the bubble. In other words, the meridian on one side of the sphere may be aligned with the meridian on the opposite side of the sphere by looking through the transparent body of the sphere as well as the transparent liquid enclosed. This arrangement decreases the inaccuracies which might result from observing the bubbles through the surface of the sphere.

These and other objects and novel features of the present invention will be more clearly and fully setforth in the following specification and claims:

In the drawings forming a part of the specification:

Figure 1:
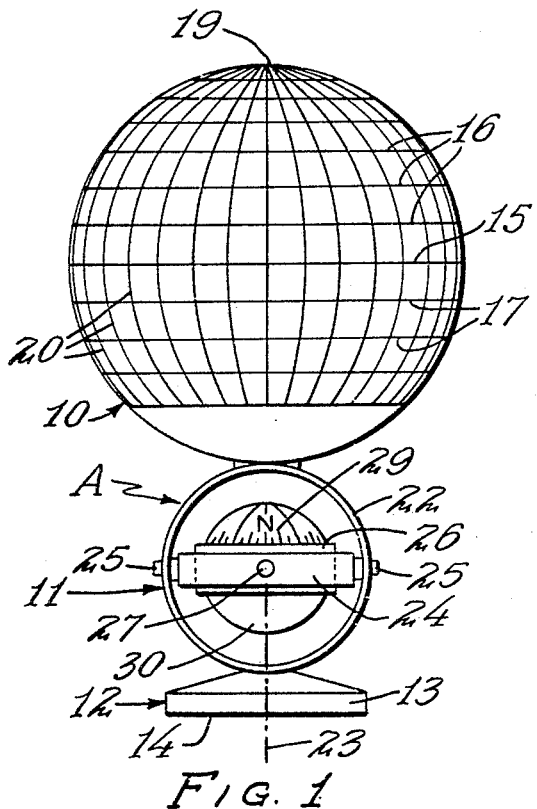
FIGURE 1 is a side elevational view of a combination level and compass, showing the general arrangement of parts therein.

In general, the apparatus A includes a level which is indicated in general by the numeral 10, a compass support, which is indicated in general by the numeral 11, and a base which is indicated in general by the numeral 12. While the shape of the base may vary, it is preferably provided with a circular lower portion 13 having a flat undersurface 14 designed to rest upon any flat surface. The axis of the circular portion 14 of the base is arranged to extend through the axis of the globe in sphere 10, The globe 10 which is of spherical form is made of a transparent material such as glass or plastic. It includes a line 15 arranged on a plane normal to the vertical axis of the sphere and extending through the center of the sphere. Above and below the line 15, which is similar in position to the equator on a spherical map are arranged circular lines 16 and 17. The angular distance between each pair of parallel circular lines is a fixed amount such as eleven and one-quarter degrees. The lines 16 encircle the sphere at these equal intervals from the line 15 to the point 19 which simulates the north pole. Similar circular lines 17 are arranged on parallel planes below the largest diameter line 15.

In similar manner, equally spaced arcuate lines 20 extend from the north pole point 19 to the lowermost circular line 17. These lines are similar to meridians on a spherical map, and are spaced apart equal angular distances, such as, for example, eleven and one-quarter degrees. If preferred, the lines 20 may be spaced apart in angular distance of 10 degrees, 15 degrees, or any other suitable distance.

Figure 2:
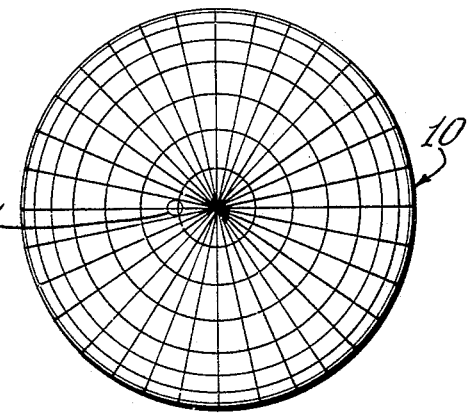
FIGURE 2 is a top plan view of the combination level and compass illustrated in FIGURE 1.
Figure 3:
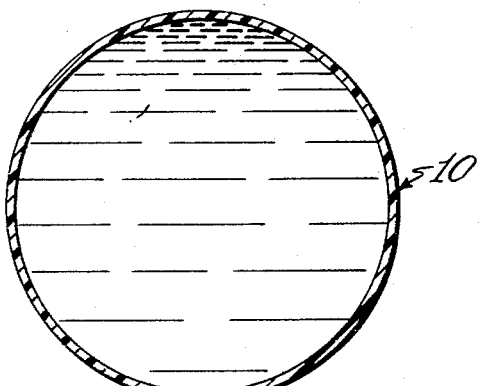
FIGURE 3 is a vertical sectional view through a structure shown in FIGURE 1.
Figure 4:
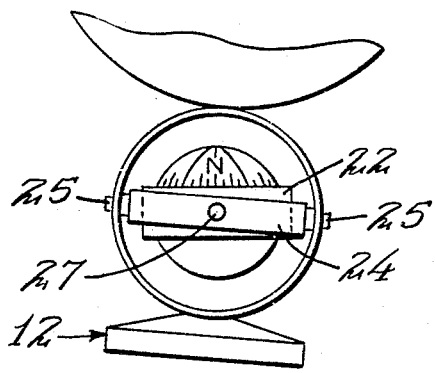
FIGURE 4 is an elevational view of the compass portion of the combination when the level is supported on an inclined surface.

The sphere 10 is substantially filled with a liquid, leaving only an air bubble 21 at the top of the liquid. This air bubble floats about within the sphere so as to always be on the top of the liquid regardless of which way the sphere is tipped. FIGURE 2 of the drawings shows the bubble 21 angularly offset from the north pole point 19, showing that the base 12 of the device is tilted as indicated in FIGURE 4 of the drawings.

The compass support 11 comprises a ring-shaped body 22 having a horizontal axis which intersects the vertical axis of the entire apparatus which is indicated by the broken line 23. The ring 22 supports a ring 24 of slightly smaller diameter having diametrically extending pivots 25 connecting it with diametrically opposed points on the ring 22. The compass includes a cylindrical housing portion 26 which is supported within the ring 24 by means of a pair of diametrically opposed pivots 27 which intersect the axes of the pivots 25 and are arranged at 90 degrees with respect thereto. The compass body 29 is supported within the ring 26.

The compass 29 is enclosed within a spherical housing, the lower end 30 of which is weighted so as to support the vertical axis of the compass in a true vertical position. If the combined level and compass shown in FIGURE 2 is tilted to the left or right from the position shown in FIGURE 1, the compass 29 will pivot about the axes of the aligned pivots 27. One such position is indicated in FIGURE 4. If the device is pivoted in a plane normal to the surface of the drawing, the compass will pivot about the aligned axes of the pivots 25.

It will be noted that with the structure disclosed, the angle at which the bottom surface 14 of the base 12 is inclined may be readily determined by noting the position of the bubble 21. Obviously, the lines upon the surface of the sphere can be much closer together than those described so that the actual number of degrees from the horizontal may be easily noted. At the same time, the direction of the incline may be readily noted by lining up any of the meridians with the compass and relating it to the position of the bubble 21. Obviously, the position of the level sphere 10 relative to the flat surface 14 of the base is fixed while the compass is supported in such a manner as to always remain on a vertical axis regardless of the tilt of the device.

I claim:
1. A combination level and compass including:
    a hollow transparent spherical globe,
    liquid substantially filling said globe and leaving a bubble of air on the surface of the liquid,
    a first ring secured substantially tangentially to said globe,
    a base secured to said first ring in diametrically opposed relation to said globe and having a bottom surface on a plane normal to a center line through the axis of said globe and intersecting the axis of said ring at right angles thereto,
    a second ring pivotally secured to diametrically opposite sides of said first ring on an axis intersecting said center line and at right angles to said center line,
    a third ring pivotally connected to said second ring on an axis extending diametrically across said second ring and intersecting said axis of said second ring at the point of intersection of said second ring axis and said center line,
    a compass supported by said third ring coaxially therewith, and
    a counterweight connected to said compass to hold the same on a horizontal plane.
2. The structure of claim 1 and in which said compass is enclosed in a spherical transparent shell.

References Cited

UNITED STATES PATENTS

| | | |
|---|---|---|
| 1,097,925 | 5/1914 | Johnson. |
| 1,175,307 | 3/1916 | Schroeder. |
| 1,376,727 | 5/1921 | Pentz et al. |
| 1,925,223 | 9/1933 | Ahlburg. |
| 2,098,476 | 11/1937 | Webster. |
| 2,767,483 | 10/1956 | Sauer. |

FOREIGN PATENTS

| | | |
|---|---|---|
| 116,166 | 6/1918 | Great Britain. |
| 330,803 | 10/1935 | Italy. |

ROBERT B. HULL, Primary Examiner

U.S. Cl. X.R.

33—222